Dec. 17, 1929.  J. A. HILL  1,739,590
FISHHOOK FASTENING DEVICE
Filed Oct. 15, 1928
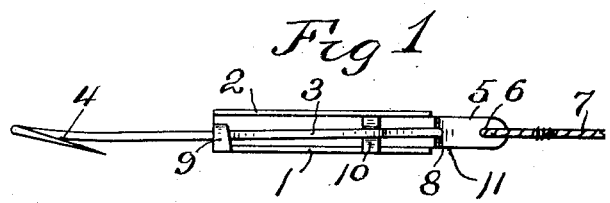
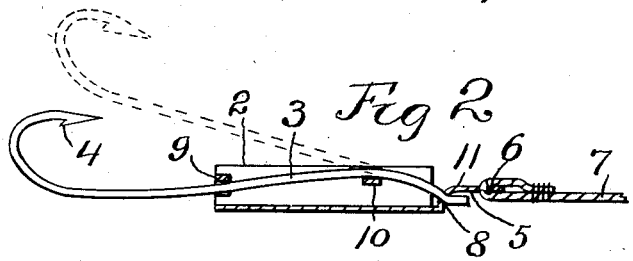
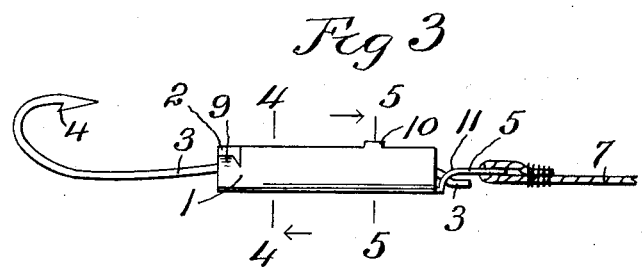
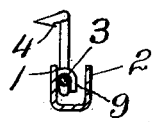
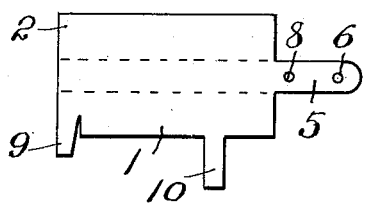
INVENTOR.
John A. Hill,
BY Warren D. House.
His ATTORNEY.
Witness
H. Vernon Olsen Patented Dec. 17, 1929

1,739,590

UNITED STATES PATENT OFFICE

JOHN A. HILL, OF KANSAS CITY, MISSOURI, ASSIGNOR OF ONE-THIRD TO MERRITT H. SHIRLEY, OF KANSAS CITY, MISSOURI

FISHHOOK-FASTENING DEVICE

Application filed October 15, 1928. Serial No. 312,427.

My invention relates to improvements in fish hook fastening devices.

One of the objects of my invention is to provide a novel device for releasably fastening a fish hook to a line in a manner such that the hook may be easily and quickly detached from the line, so that the hook may be readily unhooked and withdrawn from the fish that has been caught on it.

A further object of my invention is to provide a novel hook fastening device of the kind described, which is simple, cheap to make, durable, strong, not liable to get out of order, efficient in operation, and which will serve as a sinker.

The novel features of my invention are hereinafter fully described and claimed.

In the accompanying drawing, which illustrates the preferred embodiment of my invention, Fig. 1 is a plan view of my improved device, showing the hook in operative position.

Fig. 2 is a longitudinal vertical sectional view of the same.

Fig. 3 is a side elevation of the same.

Fig. 4 is a cross section on the line 4—4 of Fig. 3.

Fig. 5 is a section on the line 5—5 of Fig. 3.

Fig. 6 is a plan view of a blank from which the fastener is formed.

Similar reference characters designate similar parts in the different views.

The fastening device comprises a channel member having longitudinal side flanges 1 and 2 adapted to receive between them a resilient shank 3 of a fish hook having the usual barb 4.

The shank of the hook shown is devoid, at its free end, of the usual eye for receiving a fishing line, to enable the easier detachment of the hook from the fish. However a hook having such an eye may be employed in connection with my improved fastener.

One end of the channel member is provided with a longitudinal arm 5 having a hole 6 therethrough for the reeving therethrough of a fishing line 7 to which the device is to be attached.

The arm 5 at the rear of the flanges 1 and 2 is provided with a hole 8 adapted to releasably receive therethrough the free end of the shank 3.

The upper edge of the flange 1, at the front end thereof, has a bent finger 9 which extends inwardly and downwardly toward the bottom of the channel member. There is sufficient space provided between the finger 9 and the flange 2 to permit the shank 3 of the hook to pass below and under the finger.

Intermediate of the finger 9 and the rear end of the flange 1, a lip 10 extends from the upper edge of the flange 1 inwardly, downwardly and then upwardly to form a seat upon which the shank 3 is adapted to be held under tension by the finger 9.

The said seat is disposed, preferably, out of alinement with the finger 9 and the hole 8, so that a normally substantially straight shank, when engaged by the finger 9 and resting on the seat, will be bent and under tension, as shown in Fig. 2, by solid lines.

In the manufacture of the fastening member, a blank of sheet metal, such as aluminum, brass or steel is cut with a die, or otherwise provided, from the metal, after which the finger 9, and lip 10 are formed, and the body of the blank is bent at right angles along the parallel dotted lines, shown in Fig. 6. An arcuate bend 11 is provided in the arm 5 in the part having the hole 8.

The bent portion 11 of the arm 5 serves as an anchoring bearing for the free end of the shank 3.

To attach the hook to the fastener, the free end of the shank 3 is inserted into the hole 8, after which the shank is passed between the flanges 1 and 2 under the finger 9. In such passing of the shank, it will rest and be held under tension on the seat lip 10 by the finger 9, so that in use it can not be accidentally detached from the fastener.

When a fish is hooked, it is sometimes difficult to release the barb 4 from the fish. With the use of my invention, the shank 3 is released from the finger 9, upon which the hook will assume the position shown in dotted lines in Fig. 2, when it can readily be withdrawn from the hole 8 and from engagement with the channel member. The hook may then be detached from the fish by pulling the free end of the shank forwardly.

After the fish is detached from the hook, the latter may be again attached to the fastening device in the manner heretofore set forth.

The fastening device will also serve as a sinker for the hook and line.

I do not limit my invention to the structure shown and described, as modifications, within the scope of the appended claims, may be made without departing from the spirit of my invention.

What I claim is:—

1. In a fish hook fastening device, a member having a bearing, a bent finger, seat, and means for attachment to a fishing line, of a fish hook having a resilient shank releasably engaging said bearing, and releasably held by said finger under tension on said seat.

2. In a fish hook fastening device, a member having a bearing, a seat, means for attachment to a fishing line, and hook engaging means, of a fish hook having a resilient shank releasably engaging said bearing and releasably held under tension on said seat by said engaging means.

3. In a fish hook fastening device, a member having means for attachment to a fishing line and having a hole, a seat, and hook engaging means, of a fish hook having a resilient shank releasably inserted in said hole and releasably held under tension on said seat by said hook engaging means.

4. In a fish hook fastening device, a channel member having means for attachment to a fishing line and a bearing, and having between said flanges a seat and hook engaging means, of a fish hook having a resilient shank disposed between said flanges, engaging said bearing, and releasably held under tension on said seat by said hook engaging means.

5. A fish hook fastening device comprising a channel member having means for attachment to a fishing line and having a bearing adapted to engage a resilient shank of a fish hook, and provided with a finger and a seat intermediate of said finger and said bearing and upon which said shank is adapted to be held under tension by said finger.

6. A fish hook fastening device comprising a channel member having at one end and at the bottom of the channel a longitudinal arm having a bearing portion, said arm having means for attachment to a fishing line, a bent finger and a seat between the flanges of said member, said seat being intermediate of said bearing portion and said finger and being adapted to have held thereon under tension by said finger a resilient fish hook shank disposed between said flanges.

In testimony whereof I have signed my name to this specification.

JOHN A. HILL.